(12) United States Patent
De Rijcke et al.

(10) Patent No.: US 8,017,053 B2
(45) Date of Patent: Sep. 13, 2011

(54) MANUFACTURING OF SHAPED COOLANT HOSES

(75) Inventors: Jenne De Rijcke, Laarne (BE); Antonius van Meesche, Boucoiran et Noziéres (FR)

(73) Assignee: ExxonMobil Chemical Patents Inc., Houston, TX (US)

( * ) Notice: Subject to any disclaimer, the term of this patent is extended or adjusted under 35 U.S.C. 154(b) by 576 days.

(21) Appl. No.: 10/569,328

(22) PCT Filed: Aug. 30, 2004

(86) PCT No.: PCT/EP2004/051960
§ 371 (c)(1),
(2), (4) Date: Nov. 14, 2008

(87) PCT Pub. No.: WO2005/021643
PCT Pub. Date: Mar. 10, 2005

(65) Prior Publication Data
US 2009/0065971 A1    Mar. 12, 2009

(30) Foreign Application Priority Data
Aug. 29, 2003    (EP) ..................... 03102676

(51) Int. Cl.
*D01D 5/24*    (2006.01)
(52) U.S. Cl. ..................... 264/209.8; 425/380; 425/381
(58) Field of Classification Search ............... 264/209.8; 425/380–381
See application file for complete search history.

(56) References Cited

U.S. PATENT DOCUMENTS

| 2,911,321 | A |   | 11/1959 | Herrmann et al. |
| 3,748,077 | A | * | 7/1973  | Williams et al. ............. 425/317 |
| 4,056,591 | A |   | 11/1977 | Goettler et al. |
| 4,057,610 | A | * | 11/1977 | Goettler et al. .............. 264/108 |
| 4,345,004 | A |   | 8/1982  | Miyata et al. ................ 428/416 |
| 4,732,632 | A |   | 3/1988  | Pieslak et al. .................. 156/86 |
| 4,906,171 | A | * | 3/1990  | Miller ........................ 425/131.1 |
| 5,003,806 | A | * | 4/1991  | Nemoto .......................... 72/260 |
| 5,137,959 | A | * | 8/1992  | Block et al. .................. 524/430 |
| 5,156,862 | A | * | 10/1992 | Kawaguchi .................. 425/325 |
| 5,336,349 | A | * | 8/1994  | Cornils et al. ................ 156/107 |
| 5,609,962 | A | * | 3/1997  | Ouhadi ........................ 428/480 |
| 6,072,003 | A |   | 6/2000  | Horrion et al. .................. 525/88 |
| 6,300,418 | B1| * | 10/2001 | Brzoskowski et al. ....... 525/191 |

FOREIGN PATENT DOCUMENTS

| GB | 1 480 219   | 7/1977 |
| WO | WO9955793   | 11/1999 |
| WO | WO03062309  | 7/2003 |

OTHER PUBLICATIONS

Peterson et. al., Robotic Extrusion, a Novel Technology for Complex Sealing Profiles Using Santoprene Thermoplastic Rubber, ANTEC 2001 Plastics, vol. 3.*
Goettler et al, Extrusion Shaping of Curved Hose Reinforced with Short Cellulose Fibers, Rubber Chemistry and Technology, vol. 54, pp. 277-301, 1981.*

(Continued)

*Primary Examiner* — Yogendra Gupta
*Assistant Examiner* — Amjad Abraham

(57) ABSTRACT

The present invention relates to a process for manufacturing a shaped article such as tubes, and hoses comprising processing a fiber-reinforced thermoplastic polymer in an extruder apparatus.

16 Claims, 2 Drawing Sheets

OTHER PUBLICATIONS

Saikrasun et al. in "Kevlar Reinforcement of Polyolefin-Based Thermoplastic Elastomer", Polymer, Elsevier Science Publishers B.V., GB, vol. 40, Nr. 23 pp. 6437-6442, 1999.

L. A. Goettler, A. J. Lambright, R. I. Leib and P. J. DiMauro at the meeting of the Rubber Division of the American Chemical Society on Oct. 7-10, 1980 in Detroit, Michigan.

L. A. Goettler et al., "Short Fiber Reinforced Hose—A New Concept In Production And Performance," presented at a meeting of the Rubber Division, American Chemical Society, Atlanta, Georgia, Mar. 27-30, 1979. J., pp. 838-863.

Du Pont Kevlar cut fiber, Specialty Additives for Enhanced Performance, Product Information Sheet (H67190) Oct. 1998, pp. 1-2.

* cited by examiner

MANUFACTURING OF SHAPED COOLANT HOSES

CROSS REFERENCE TO RELATED APPLICATIONS

This application is a §371 National Stage Application of International Application No. of PCT/EP2004/051960, filed Aug. 30, 2004, which claims the priority of EP03102676.8, filed Aug. 29, 2003, the disclosures of which are herein incorporated by reference in their entireties.

FIELD OF THE INVENTION

The present invention relates to a process for manufacturing a shaped article from a fiber-reinforced thermoplastic polymer in an extruder apparatus. Typical shaped articles are selected from hoses, such as coolant hoses, and tubes.

BACKGROUND OF THE INVENTION

Hose joint assemblies, in particular those assemblies used in fluid circuits for automotive and/or industrial processes, operate in exceedingly harsh environments. Factors including varying pressures and temperatures at different points of an assembly, varying diameters of different hoses in a particular circuit, as well as chemical exposure result in the need for highly rigorous hose assemblies. Therefore, it is difficult if not impossible to efficiently and economically manufacture large numbers of permanently shaped rubber hoses. Many previous attempts for manufacturing such assemblies have resulted in products that were not entirely reliable against leakage in use. After assembling engines and car bodies a connection between the different aggregates has to be accomplished. Due to the minor amount of space under the hood of an automotive, the rubber hoses used for the connection of engine, cooler and radiator, etc. have to be individually adapted to the various engine and car body types. The shape may often be very complex dependent on the available space under the vehicle hood.

Consequently, there is a strong need for hoses, in particular coolant hoses, having a complex shape and a good resistance to the rough environmental conditions in applications under the hood.

A further object of the present invention is the provision of coolant hoses that can easily be recycled and are of lower weight compared to hoses known in the prior art.

Additionally, a process for manufacturing of said hoses in an individual and economic manner, in particular in view of the production of limited quantities is desired.

As a material for the manufacturing of coolant hoses thermoplastic polymers, such as thermoplastic elastomers have been established in the last few years. Thermoplastic elastomers (TPE) combine both thermoplastic and elastic properties. Compared to the use of vulcanizable, non-thermoplastic rubbers, a separate vulcanizing step that affords a high temperature treatment of the shaped unvulcanized hoses is not necessary anymore.

In order to achieve the desired resistance against high temperatures and working pressures a reinforcement of the thermoplastic elastomers is necessary.

For several reasons the use of short fiber reinforced thermoplastic elastomers is mandatory for producing shaped articles, such as for permanently curved hoses, by the process according to the present invention:

The reinforcement must be present in the stock before it is extruded. An extrudate without any fiber reinforcement would collapse after leaving the die orifice.

The dispersed short fibers provide the hot extruded shaped article with structural integrity thus minimizing shape distortion before solidification of the extrudate.

The fiber reinforcement reduces the expansion of, for instance, a vehicle radiator hose during its use under elevated temperatures and pressures.

However, the inherent characteristic of the polyolefinic thermoplastic elastomer blends is its non-reactive surface. To achieve adhesion between the reinforcing fibers and the embedding thermoplastic matrix the reinforcing fibers have to be modified with a polar material in order to be cohesively bondable to polar substrates.

Due to their low surface tension (28-30 dyns/cm) polyolefinic thermoplastic elastomer blends as well as polyolefinic materials, such as polyethylene or polypropylene, cannot adhere directly to more polar substrates, such as polyamid, polyester, metal and glass.

Various techniques, such as chemical surface treatment, compound modification via polar ingredients, surface oxidation or reducing surface tension of polar substrates by using a primer/adhesive system have been used to increase the surface tension of polyolefinic materials.

U.S. Pat. No. 2,911,321 describes a method for bonding a polyolefin layer on polyester using an "anchoring agent" of isocyanate/blocked isocyanate that is applied to the substrate as a dilute solution in organic solvent. The polyolefin is extruded onto the treated polyester substrate and bonded by heat and pressure.

U.S. Pat. No. 4,345,004 describes a method of forming an olefinic coating on a (metal) substrate by applying a multi-layer film of epoxy resin, olefinic resin and modified olefinic resin, then heat bonding an olefinic resin layer thereto.

U.S. Pat. No. 4,732,632 describes a method of coating a substrate by applying a liquid, curable polymer composed of resin (e.g. epoxy; polyurethane precursor) and curative (e.g. isocyanurate) to the substrate, then applying a layer of polymer (e.g. polyolefin, EPDM, butyl, etc.) that can interact chemically or physically with the curable first layer.

U.S. Pat. No. 6,300,418 discloses a thermoplastic elastomer composition comprising a thermoplastic rubber containing a fully cured rubber and a thermoplastic polyolefin, a functionalized polyolefin and additives such as crosslinker and reinforcing fibers, e.g. carbon fibers.

U.S. Pat. No. 6,072,003 discloses a composition comprising a thermoplastic elastomer, a modified polyolefin and additives like fillers.

Saikrasun et al. in "Kevlar reinforcement of polyolefin-based thermoplastic elastomer", POLYMER, Elsevier Science Publishers B.V., GB, Vol. 40, Nr. 23 Pages 6437-6442 discloses a fiber reinforced thermoplastic elastomer comprising a thermoplastic elastomer, a modified polyolefin and a surface modified reinforcing aramid fiber.

International published patent application WO 03/062309 relates to a fiber reinforced rubber composition for tires comprising adhesively activated fibers in combination with melamine type crosslinking agents.

Nevertheless, reinforced elastomeric articles comprising the adhesion systems known in the art show an undesired sensitivity to humidity. Since humidity is inevitably present in vehicle cooling systems, it has been a further object of the present invention to provide an adhesion system that is less sensitive to humidity/moisture and that is suitable for coolant hoses to be used in cooling water circuits of automotive engines.

A further aspect of the present invention relates to the method of manufacturing shaped articles like cooling hoses.

By using a special die geometry, as disclosed, for instance by L. A. Goettler, A. J. Lambright, R. I. Leib and P. J. DiMauro at the meeting of the Rubber Division of the American Chemical Society on 7-10 Oct. 1980 in Detroit, Mich., the reinforcing short fibers (generally of less than 20 mm length) can be oriented toward the circumferential or hoop direction of the extruded hose, in order to counteract the high hoop stresses resulting from hydraulic pressure loading during use.

The economics of producing a reinforced hose structure in a single extrusion step through the use of a short fiber reinforced thermoplastic elastomer is further improved by this simplified shaping technique. Since down-line knitting and covering operations are eliminated through the use of short fiber reinforcement, the desired contour can be imposed on the hose right at the die. This is accomplished by simply moving the outer die out of the concentricity with the pin (inner die, or mandrel) or vice versa, so as to produce eccentricity in the annular die passage leading up to and including the orifice. Consequently, the resulting extrudate will bend away from the side of the die containing the wider passage.

By moving the inner or outer portions of the tube die out of the concentricity in a programmed sequence, the direction of extruding the hose can be made to deviate from the machine axis and thus to produce bends in the hose.

The mandrel die technology described above, in particular, facilitates the formation of tight bent hoses.

Nevertheless, it has been observed that burst strength is sacrificed in curving the hose despite of substantial increases in stress in the inner wall of the bend due to the wall thinning and curvature effects.

Additionally, the shapes of the articles obtained are often limited by the sterical interaction of extrudate with the extruder and/or extrusion die. This can be conceived when the hose is widely curved in a direction opposite to the extrusion direction. In this case the shaped article is extruded in the direction of the extruder.

One way to overcome the curvature effects described above is the manufacturing of hoses by blow molding. During the blow molding process the shape of a mold is transferred to the hose to be shaped. Therefore, this method necessitates molds having the individual shapes. Since the production of the molds is time and cost consumptive the production of hoses by said method, in particular in low quantities, is uneconomically.

It was therefore necessary to devise a method for the free shaping of coolant hoses that additionally avoids the curvature effects described above and which method does not necessitate expensive molds.

SUMMARY OF THE INVENTION

The present invention relates to a process for manufacturing a shaped article comprising processing a fiber-reinforced thermoplastic polymer in an extruder apparatus comprising an extruder barrel and an extrusion die wherein said extruder barrel discharging through a mandrel expansion extrusion die connected to a robotic handling unit, and wherein the extruder barrel is connected to the extrusion die by means of a flexible pressure hose.

The process according to the invention is applicable to any extrudable polymer composition in which fibers can be dispersed. Any polymer or polymer blend that may be extruded through dies by application of pressure is suitable in the practice of this invention. Thermoplastic polymers are particularly suitable, examples of which are polyvinyl chloride, polyethylene, polypropylene, polyvinyl acetate, polyester polymers, for example, poly(ethylene terephthalate), ABS copolymers, polyamides, for example nylon. A preferred class of extrudable polymers is represented by elastomeric polymers. One class of suitable elastomeric (rubbery) polymer comprises thermoplastic elastomers which do not require vulcanization but are shaped above their softening temperature and develop elastomeric properties upon cooling.

Examples of satisfactory thermoplastic elastomers are polyurethane-polyester elastomers (commercially available under the Trademark Texin®), segmented polyethers and polyesters (commercially available under the Trademark Hytrel®), nylon block polymers, styrenic block thermoplastic elastomers and dynamically cured blends of polyolefin resin and monoolefinic rubber. U.S. Pat. Nos. 3,806,558, 3,023,192, 3,651,014, 3,763,109, 3,775,373, 3,784,520 and 3,533,172, the disclosure of which is fully incorporated herein by reference, illustrate suitable thermoplastic elastomers.

Vulcanizable elastomers comprise another class of extrudable polymers, especially vulcanizable diene-containing elastomers. Either natural or synthetic rubbers or mixtures thereof are satisfactory. However, non-diene rubbers, like silicone rubbers or fluorinated rubbers are also satisfactory. Illustrative examples of suitable synthetic rubbers include cis-4-polybutadiene, butyl rubber, neoprene, ethylene propylene terpolymers, polymers of 1,3-butadiene, polymers of isoprene, ethylene vinyl-acetate copolymers and copolymers of 1,3-butadiene with others monomers, for example, styrene, acrylonitrile, isobutylene and methylmethacrylate.

The reinforcing fibers to be used in conjunction with the thermoplastic polymers are further specified under paragraph "Reinforcing Fibers (D)" below.

In the reinforced thermoplastic polymers used in the process of this invention the amount of reinforcing fibers (D) is from about 1 to about 30 wt.-%, preferably from about 5 to about 20 wt.-%, most preferably from about 8 to 16 wt.-%, based upon the total of the thermoplastic polymer and the reinforcing fibers (D).

In a preferred embodiment the reinforcing fibers are finely dispersed within the thermoplastic polymer by methods known in the art, such as melt blending.

Thermoplastic Elastomer Composition

The thermoplastic elastomer composition used as one alternative thermoplastic polymer in the process according to the present invention comprises
(A) a thermoplastic rubber comprising
   i. an at least partially cured rubber containing not more than 50 wt.-% of extractable rubber (23° C., 48 h, cyclohexane); and
   ii. a thermoplastic polyolefin homopolymer or copolymer;
(B) a functionalized polyolefin;
(C) a crosslinking agent selected from resins obtainable by reacting melamine, urea, benzoguanamine and/or glycoluril with formaldehyde, epoxy- and isocyanate resins; and
(D) reinforcing fibers adhesion activated by an epoxy resin selected from the group of glycerol-polyglycidylether, the reaction product of bisphenol A and epichlorohydrin and/or a blocked diisocyanate.

In a preferred embodiment the thermoplastic rubber is fully cured, i.e., it contains not more than 5 wt.-% of extractable rubber (23° C., 48 h, cyclohexane).

The crosslinked fiber reinforced thermoplastic elastomers obtainable from the compositions according to the invention have excellent mechanical properties, high temperature and pressure resistance and a significantly decreased sensitivity to humidity.

Furthermore, the short fibers dispersed within the thermoplastic elastomer matrix lead to an improved structural integrity (green strength) that results in a minimum of shape distortion of the hot extrudate leaving the die orifice prior to its solidification. This structural integrity facilitates the processing of the thermoplastic compositions in the process of manufacturing shaped articles, preferably free-standing shaped articles having improved dimensional stability, as described herein below.

The fiber-reinforced thermoplastic elastomer compositions are made by a process comprising the steps of
(I) melt-blending of
   (i) a curable thermoplastic rubber,
   (ii) a thermoplastic polyolefin homopolymer or copolymer, and
   (iii) a curative,
(II) dynamically vulcanizing the mixture to at least partially cure the curable thermoplastic rubber to obtain a thermoplastic rubber;
(III) melt-blending of
   (A) the at least partially cured rubber containing not more than 50 wt.-% of extractable rubber (23° C., 48 h, cyclohexane) of step (II);
   (B) a functionalized polyolefin;
   (C) a crosslinking agent; and
   (D) adhesion activated fibers.

In a preferred embodiment the curable rubber is fully cured, i.e., it contains not more than 5 wt.-% of extractable rubber (23° C., 48 h, cyclohexane). The reinforced thermoplastic elastomer compositions having the properties mentioned above are preferably obtainable by said method after crosslinking.

According to the present invention it has surprisingly been found that an arrangement combining a mandrel die and a robotic handling unit as described in U.S. Pat. No. 5,336,349 the content of which is fully incorporated herein by reference, solves the problem of sterical interaction of the extrudate with the extrusion die and does not necessitate a mold. The device according to the present invention facilitates the orientation of the extrusion die by the robotic handling unit.

The apparatus used in conjunction with the process of the present invention comprises (a) an extruder, (b) a mandrel expansion extrusion die, (c) a robotic handling unit, and (d) a flexible pressure hose, connecting the extruder (a) with the mandrel expansion extrusion die (b), wherein the mandrel expansion extrusion die (b) is controllably connected to the robotic handling unit (c).

In a preferred embodiment the mandrel expansion extrusion die (b) used in the process according to the present invention is an extrusion die having an inner or an outer die that can be offset to result in excentricity in the annular die passage.

Thus, the apparatus used according to the invention facilitates the three-dimensional shaping of extrudates having wide and close bends without causing sterical interactions of the extrudate and parts of the extruder.

The process according to the present invention leads to shaped extruded articles of manufacture comprising the crosslinked reinforced thermoplastic elastomer composition described above. This article may be, for instance, a tube, or a hose, such as coolant hose having high resistance to humidity and excellent mechanical properties, such as pressure and temperature resistance.

The resulting extruded article may be of a complex shape, i.e., having acute and wide bends, wherein the wide bends that are formed by the movement of the robotic handling unit having a constant wall-thickness on the inside as well as on the outside of the curve.

Alternative and preferred embodiments of the present invention become apparent from the claims and the description that follows.

DETAILED DESCRIPTION OF THE INVENTION

Figure 1:
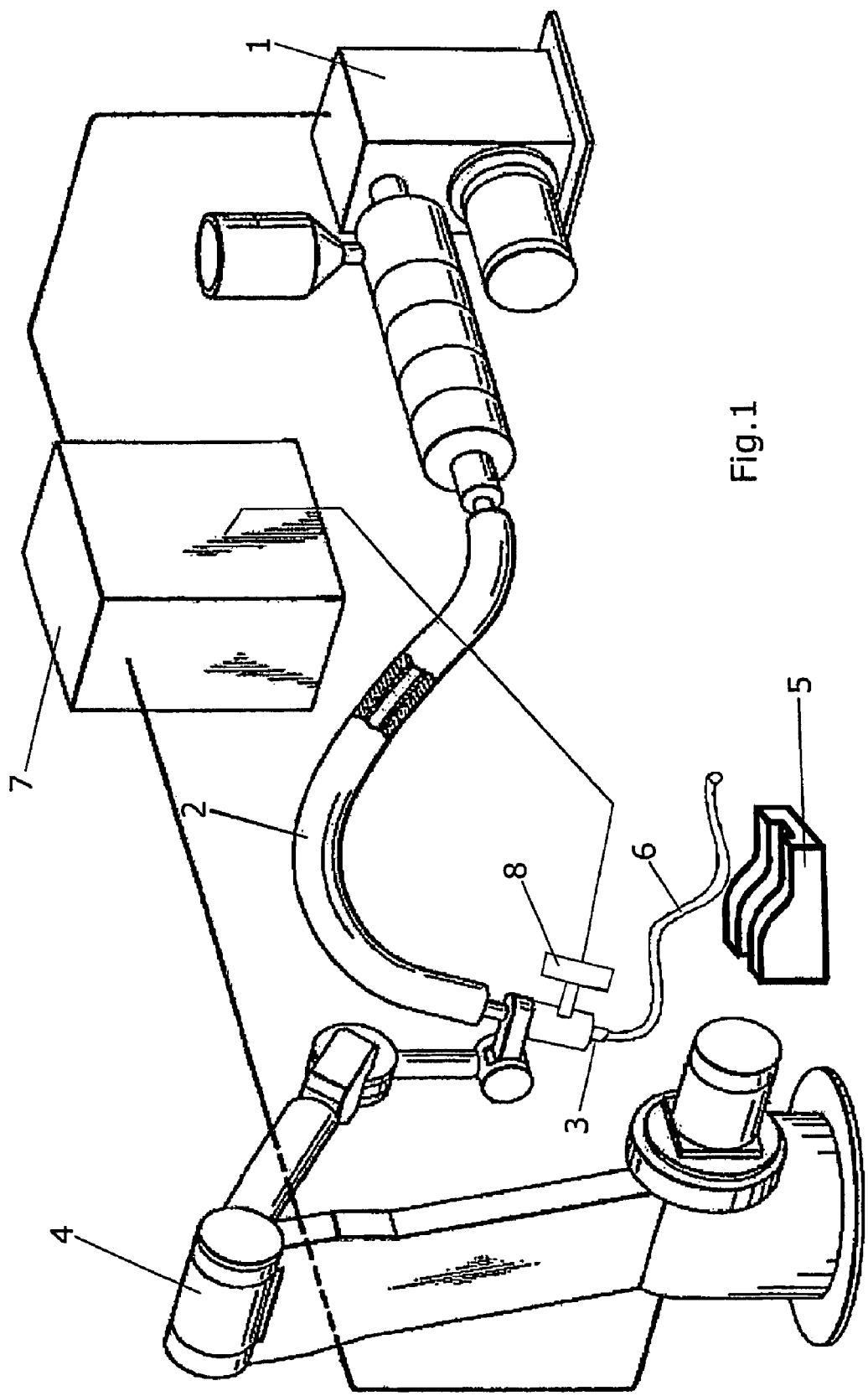
FIG. 1 is a perspective view of the apparatus according to this invention

In one embodiment of the thermoplastic polymers the reinforced thermoplastic elastomer composition used in the process according to the present invention can be obtained by blending thermoplastic rubber, a functionalized polyolefin (B), a crosslinking agent (C) and adhesion activated reinforcing fibers (D).

Preferably, the curable rubber (i), the thermoplastic polyolefin homopolymer or copolymer (ii) and the optional curative (iii) have been pre-blended and cured to form the fully cured thermoplastic elastomer (A) prior to its blending with the functionalized polyolefin (B), the crosslinking agent (C) and the adhesion activated reinforcing fibers (D).

The components are mixed at a temperature sufficiently elevated to soften the resin or, preferably, at a temperature above its melting point at which the resin is crystalline at room temperature.

Mixing/blending of the individual compounds is performed using conventional mixing equipment such as roll mills, Banbury mixers, Brabender mixers, continuous mixers, mixing extruders, and the like. Conventional fillers and additives can be added to the composition at any stage of making it.

Preferably, the addition of the crosslinking agent (C) represents the final step of the process.

Thermoplastic Rubber (A)

The thermoplastic rubber (elastomer) composition used according to the present invention as component (A) is generally obtained by blending a thermoplastic polyolefin with an elastomer (rubber) in a way that the elastomer is intimately and uniformly dispersed as a discrete particulate phase within a continuous phase of the thermoplastic. Early work with vulcanized compositions is found in U.S. Pat. No. 3,037,954 to Gessler which discloses static vulcanization as well as the technique of dynamic vulcanization wherein a vulcanizable elastomer is dispersed into a resinous thermoplastic polymer and the elastomer is cured while continuously mixing and shearing the polymer blend. The resulting composition (thermoplastic elastomer vulcanizate "TPV") is a microgel dispersion of cured elastomer, such as butyl rubber, chlorinated butyl rubber, polybutadiene, polyisobutene etc. in an uncured matrix of thermoplastic polymer, such as polypropylene.

Accordingly, the thermoplastic rubber component (A) may generally be pre-pared by mixing (i) an uncured rubber, (ii) a thermoplastic polyolefin homopolymer or copolymer and, optionally, (iii) conventional additives and fillers, then melting the mixture under kneading until a homogeneous blend is obtained. The addition of curing agents (also referred to as curatives, crosslinking- or vulcanizing agents) to the blend during the mixing under conditions of heat and shear results in a composition of an at least partially cured, preferably a fully cured (also referred to as "fully vulcanized" or "fully crosslinked") rubber dispersed in a thermoplastic matrix.

The term "rubber" as used herein means any natural or synthetic polymer that can be cured so as to exhibit elastomeric properties. For the purpose of this invention the term "elastomer" is used interchangeably with the term "rubber".

The term "fully cured" used in conjunction with the dynamically cured rubber component of this invention denotes that the rubber component to be vulcanized has been cured to a state in which the physical properties of the rubber are developed to impart elastomeric properties to the rubber generally associated with the rubber in its conventional vulcanized state. The degree of cure of the vulcanized rubber can be described in terms of gel content or, conversely, extractable rubber components. Alternatively, the degree of cure can be expressed in terms of cross-link density. Where the determination of extractable rubber is an appropriate measure of the state of cure, the improved thermoplastic elastomeric compositions are produced by vulcanizing the curable rubber component of the blends to the extent that the composition contains, with increasing preference in the order given, no more than about 5, 4, 3, 2, 1 weight percent of the rubber component after curing being extractable at room temperature by a solvent that dissolves the uncured rubber. In one alternative the test specimen is extracted by cyclohexane at 23° C. for 48 hours. In another alternative the test specimen is extracted in boiling xylene for one half hour. In general, the less extractable rubber the cured rubber component contains the better the properties of the TPE are. It follows that compositions comprising essentially no extractable rubber from the cured rubber phase are highly preferable. In terms of the present invention the term "no extractables" means less than about 0.5 percent by weight, ideally 0 percent by weight extractables. Gel content, reported as percent gel is determined by a procedure that comprises determining the amount of insoluble polymer by soaking the specimen for about 48 hours in an organic solvent (for instance, cyclohexane) at room temperature and weighing the dried residue and making suitable correactions based upon knowledge of the composition. Thus, corrected initial and final weights are obtained by subtracting from the initial weight, the weight of soluble components, other than the rubber to be vulcanized, such as extender oils, plasticizers and components of the compositions soluble in organic solvent, as well as that rubber component of the TPV which it is not intended to cure. Any insoluble pigments, fillers, etc., are subtracted from both the initial and final weights. Supplementary to the above it is referred to U.S. Pat. No. 4,311,628, the disclosure of which is incorporated herein by reference.

The term "partially cured" used in conjunction with the dynamically cured rubber component denotes that with increasing preference in the order given, up to about 50, up to 30, up to 15, up to but not including 5 weight percent of the cured rubber component being extractable at room temperature by a solvent that dissolves the uncured rubber (23° C., cyclohexane, 48 h). As specified above fully cured rubbers are preferred.

In the measurement of the gel content a sample of a thermoplastic elastomer composition of about 100 g is weighed and cut into fine fragments (size: 0.5 mm×0.5 mm×0.5 mm). In a closed vessel, the sample is immersed in 30 ml of cyclohexane at 23° C. for 48 hours. Then, the sample is taken out, placed on a filter paper and dried at room temperature for not less than 72 hours until a constant weight is reached. From the weight of the dry residue, the weight of all the cyclohexane-insoluble components (e.g., fibrous filler, filler, pigment) other than the polymer component is subtracted. The obtained value is taken as "corrected final weight (Y)". On the other hand, from the sample weight, the weight of the cyclohexanesoluble components (e.g., softener) other than the polymer component and the weight of the cyclohexane-insoluble components (e.g., fibrous filler, filler, pigment) are subtracted. The obtained value is taken as "corrected initial weight (X)". The gel content (content of the cyclohexane-insoluble components) is calculated by the following equation.

$$\text{Gel – Content [wt.–\%]} = \frac{Y}{X} \cdot 100$$

In a preferred embodiment said thermoplastic rubber (A) has a Shore hardness from about 20A to about 60D, preferably from about 30A to about 40D, most preferably about 35A to about 85A (as measured according to ASTM D2240-02 @ 5 seconds delay).

In a further preferred embodiment the thermoplastic rubber (A) has an LCR-viscosity (laboratory capillary rheometer) of about 45 to about 70 Pa·s, preferably about 50 to about 65 Pa·s, and in a specific embodiment about 55 Pa·s.

For preparing the thermoplastic rubber composition used as the component (A) in the composition according to the present invention rubber (i) is mixed with the thermoplastic polyolefin homo- or copolymer (ii) at a temperature sufficient to soften the resin or, more commonly, at a temperature above its melting point where the resin is crystalline at room temperature. After the polyolefin and rubber are intimately mixed, the curative is added. Heating and masticating with shearing at vulcanization temperatures are generally adequate to complete vulcanization in about 0.5 to about 10 minutes. The curing time can be reduced by elevating the curing temperature. A suitable range of curing temperatures is from about the peak melting point of the resin (for instance, about 130° C. for high density polyethylene and about 165° C. for polypropylene) to about 250° C. More typically, the temperature range is from about 160° C. to about 225° C. Preferably the vulcanization is carried out at a temperature ranging from about 170° C. to about 200° C.

Dynamic vulcanization is effected by mixing the thermoplastic and elastomer components at elevated temperature on conventional mixing equipment such as roll mills, Banbury mixers, Brabender mixers, continuous mixers, mixing extruders and the like.

Suitable thermoplastic rubbers (A) that can be used in conjunction with the present invention are commercially available, for instance from Advanced Elastomer Systems, Akron, Ohio, USA, under the trade designations Santoprene®.

In accordance with the process according to the present invention thermoplastic rubbers (A) utilizing phenolic curing systems are preferably used.

In the following the individual constituents of the thermoplastic rubber (A) are described in more detail.

Rubber (i)

Illustrative, non-limiting examples of rubbers (i) suitable for use in the thermoplastic rubber (A) include rubbers selected from the group consisting of ethylene/alpha-olefin/non-conjugated diene copolymer rubbers, such as ethylene-propylene/non-conjugated diene rubber (EPDM), ethylene/alphaolefin copolymer rubber wherein the alpha-olefin is of the formula $CH_2=CHR$ and wherein R is a straight or branched alkyl group having 1 to 12 carbon atoms such as propylene, 1-butene, isobutylene, 1-pentene, 1-hexene, 1-heptene, 1-octene, 3-methyl-1-pentene, 4-methyl-1-pentene, 5-methyl-1-hexene, and the like. A preferred ethylene/alpha-olefin rubber is ethylene/propylene copolymer rubber (EPM). Further examples of rubbers are butyl rubber, halogenated butyl rubber, copolymers of $C_4$ to $C_7$ isomonoolefins and para-alkylstyrene and their halogenated derivatives, natural or synthetic rubbers, polyisoprene rubber, polybutadiene rubber, styrene/butadiene copolymer rubbers, and blends thereof.

The curable or vulcanizable rubbers that can be used in the practice of this invention include both synthetic and natural rubbers; at least one of the rubbers utilized must be vulcanizable.

While polyisobutylene (PIB) is not a true rubber because it cannot be vulcanized, it can be utilized in the practice of this invention in conjunction with a vulcanizable rubber provided that the PIB has a viscosity average molecular weight of from about 40,000 to about one million.

The term "nitrile rubber" means an acrylonitrile copolymer rubber. Suitable nitrile rubbers comprise rubbery polymers of 1,3-butadiene or isoprene and acrylonitrile. Preferred nitrile rubbers comprise polymers of 1,3-butadiene and about 20 to 50 weight percent acrylonitrile. Any nitrile rubber that is a "solid" rubber having an average molecular weight of at least 50,000, and preferably from about 100,000 to 1,000,000 can be used. Commercially available nitrile rubbers suitable for the practice of the invention are described in Rubber World Blue Book, 1980 Edition, Materials and Compounding Ingredients for Rubber, pages 386-406.

Suitable halogenated copolymers of a $C_4$ to $C_7$ isomonoolefin and a para-alkylstyrene include copolymers comprising para-alkylstyrene moieties which may be represented by the formula:

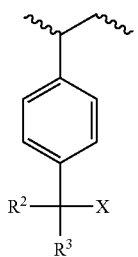

wherein $R^2$ and $R^3$ are independently selected from the group consisting of hydrogen, alkyl groups having about 1 to 5 carbon atoms, primary and secondary haloalkyl groups having about 1 to 5 carbon atoms, and X is selected from the group consisting of bromine, chlorine and mixtures thereof, such as those disclosed in published European Patent application 0355021. Preferably, the alkylstyrene copolymer is a halogenated copolymer of isobutylene and para-methylstyrene, more preferably, the brominated copolymer of isobutylene and para-methylstyrene.

Butyl rubber is a copolymer of an isoolefin and a conjugated multiolefin. The useful rubber copolymers comprise a major portion of isoolefin and a minor amount, preferably not more than about 30 weight percent, of a conjugated multiolefin. The preferred rubber copolymers comprise about 85- to about 99.5 weight percent (preferably about 95 to 99.5 weight percent) of a $C_4$ to $C_7$ isoolefin, such as isobutylene, and about 15 to 0.5 weight percent (preferably about 5 to 0.5 wt %) of a multiolefin of about 4 to 14 carbon atoms. These copolymers are referred to in the literature as "butyl rubber."

The term "butyl rubber" as used herein includes the aforementioned copolymers of an isoolefin having 4 to 7 carbon atoms and about 0.5 to about 20 weight percent of a conjugated multiolefin of about 4 to 14 carbon atoms. Preferably these copolymers contain about 0.5 to about 5% conjugated multiolefin. The preferred isoolefin is isobutylene. Suitable conjugated multiolefins include isoprene, butadiene, dimethyl butadiene, piperylene, etc. Commercial butyl rubber is a copolymer of isobutylene and minor amounts of isoprene.

Butyl rubber as above described may be halogenated with from about 0.1 to about 10, preferably, about 0.5 to about 3.0 weight percent chlorine or bromine to make a suitable halobutyl rubber. The chlorinated form of butyl rubber is commonly known as "chlorobutyl rubber" and the brominated form as "bromobutyl rubber."

Another suitable rubber according to the present invention is based on polychlorinated butadienes such as polychloroprene rubber. These rubbers are commercially available under the trade names Neoprene® (DuPont Dow) and Bayprene® (Mobay).

In a preferred embodiment of the invention the rubber (i) is an ethylene/alpha-olefin copolymer rubber (EPM) or ethylene/alpha-olefin/non-conjugated diene copolymer rubber (EPDM), the latter being most preferred.

The non-conjugated diene monomer can be a straight chain, branched chain or cyclic hydrocarbon diene having from about 6 to about 15 carbon atoms. Examples of suitable non-conjugated dienes are straight chain acyclic dienes such as 1,4-hexadiene and 1,6-octadiene: branched chain acyclic dienes such as 5-methyl-1,4-hexadiene; 3,7-dimethyl-1,6-octadiene; 3,7-dimethyl-1,7-octadiene and mixed isomers of dihydromyricene and dihydroocinene; single ring alicyclic dienes such as 1,3-cyclopentadiene; 1,4-cyclohexadiene; 1,5-cyclooctadiene and 1,5-cyclododecadiene: and multiring alicyclic fused and bridged ring dienes such as tetrahydroindene, methyl tetrahydroindene, dicyclopentadiene; bicyclo-(2,2,1)-hepta-2,5-diene; alkenyl, alkylidene, cycloalkenyl and cycloalkylidene norbornenes such as 5-methylene-2-norbornene (MNB); 5-propenyl-2-norbornene, 5-isopropylidene-2-norbornene; 5-(4-cyclopentenyl)-2-norbornene, 5-cyclohexylidene-2-norbornene, 5-vinyl-2-norbornene and norbornadiene.

Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

The ethylene/alpha-olefin/non-conjugated diene rubber contains from about 40 to about 85 weight percent of ethylene, preferably from about 45 to about 80 weight percent, and more preferably in the range of from about 50 to about 75 weight percent, based on the ethylene/propylene/non-conjugated diene rubber. The ethylene/propylene/non-conjugated diene rubber contains from about 0.25 to about 5 weight percent of diene, preferably from about 0.25 to about 2 weight percent and more preferably in the range of from about 0.5 to about 1.2 weight percent. The balance of the ethylene, alpha-olefin, non-conjugated diene elastomeric polymer to about 100 percent will generally be made up of an alpha-olefin which is selected from the group consisting of propylene, 1-butene, 1-hexene, 4-methyl-1-pentene, 1-octene, 1-decene and combinations thereof, and the like. The ethylene/propylene/non-conjugated diene rubber which is preferred according to this invention contains propylene as the alpha-olefin and 5-vinyl-2-norbornene as the diene comonomer.

In the thermoplastic rubber component (A) the amount of rubber (i) generally ranges from about 95 to about 10 weight percent, based on the weight of the rubber (i) and thermoplastic resin (ii) (total polymer). Preferably, the rubber content will be in the range of from about 80 to about 20 weight percent of total polymer.

Thermoplastic Polyolefin Homopolymer or Copolymer (ii)

The term "thermoplastic polyolefin" as used herein in conjunction with the description of the thermoplastic elastomer component (A) denotes any polyolefin resin that exhibits thermoplastic properties.

A wide range of thermoplastic resins and/or their mixtures have been used in the preparation of thermoplastic elastomers, including polypropylene (PP), polypropylene copolymers, high density polyethylene (HDPE), low density polyethylene (LDPE), very low density polyethylene (VLDPE), linear low density polyethylene (LLDPE), polyethylene copolymers, cyclic olefin homopolymers or copolymers as well as olefinic block copolymers, polystyrene, polyphenylene sulfide, polyphenylene oxide and ethylene propylene copolymer (EP) thermoplastics.

Thermoplastic resins useful in the compositions produced by the invention include crystalline and semi-crystalline polyolefin homopolymers and copolymers. They are desirably prepared from mono-olefin monomers having about 2 to about 20, preferably about 2 to about 12, more preferably about 2 to about 7 carbon atoms, such as ethylene, propylene, 1-butene, isobutylene, 1-pentene, 1-hexene, 1-heptene, 1-octene, 3-methyl-1-pentene, 4-methyl-1-pentene, 5-methyl-1-hexene and mixtures thereof and copolymers thereof with (meth)acrylates, such as methyl(meth)acrylates.

As used in the specification and claims the term "polypropylene" includes homopolymers of propylene as well as reactor copolymers of polypropylene (PPRC) that can contain about 1 to about 20 weight percent of ethylene or an alpha-olefin comonomer of about 4 to about 20 carbon atoms, and mixtures thereof. The polypropylene can be atactic, isotactic or syndiotactic, made with Ziegler-Natta or metallocene catalysts. The PPRC can be either a random or block copolymer. The density of the PP or PPRC can be from about 0.88 to about 0.92 g/cm$^3$, preferably from about 0.89 to about 0.91 g/cm$^3$. Commercially available polyolefins may be used in the practice of the invention. Blends of thermoplastic resins may also be used.

The preferred polyolefin resins are high density polyethylene (HDPE) and polypropylene. While other polyolefin homopolymers and copolymers of ethylene can be utilized in the practice of this invention, the resulting TPE compositions are deficient in high temperature characteristics. Such other polyolefins include low density polyethylene (LDPE), very low density polyethylene (VLPE), linear low density polyethylene (LLDPE) and polybutylene (PB). However, these other polyolefin resins can be incorporated into the thermoplastic elastomer composition (a) of this invention along with the polypropylene (PP) or high density polyethylene (HDPE).

High density polyethylene (HDPE), useful as the polyolefin resin of this invention, has a density of about 0.941 to about 0.965 g/cm$^3$. High density polyethylene is an established product of commerce and its manufacture and general properties are well known to the art. Typically, HDPE has a relatively broad molecular weight distribution, characterized by the ratio of weight average molecular weight to number average molecular weight of from about 20 to about 40.

The term "low density polyethylene" or "LDPE" as used herein means both low and medium density polyethylene having densities of about 0.910 to about 0.940 g/cm$^3$. The terms include linear polyethylene as well as copolymers of ethylene which are thermoplastic resins.

The term "very low density polyethylene" or "VLDPE" is used herein to mean polyethylene having a density below about 0.910 g/cm$^3$ and includes linear polyethylene as well as copolymers of ethylene which are thermoplastic resins.

Linear low density polyethylene (LLDPE) is a class of low density polyethylene characterized by little, if any, long chain branching derived from $C_3$ to $C_{12}$ alpha-olefins selected from the group consisting of propylene, 1-butene, 1-hexene, 1-octene, 4-methyl-1-pentene; preferably 1-butene or 1-hexene. The processes for producing LLDPE are well known in the art and commercial grades of this polyolefin resin are available. Generally, it is produced in gas-phase fluidized bed reactors or liquid-phase solution process reactors; the former process can be carried out at pressures of about 0.69 to 2.07 MPa (100 to 300 psi) and temperatures as low as about 100° C.

The amount of thermoplastic polyolefin (ii) found to provide useful compositions (A) is generally from about 5 to about 90 weight percent, based on the weight of the rubber (i) and thermoplastic polyolefin resin (ii). Preferably, the thermoplastic resin content will range from about 20 to about 80 percent by weight of the total polymer.

Curatives (iii)

In composition (A) the rubber component will be partially, preferably fully vulcanized/crosslinked. Those of ordinary skill in the art will appreciate the appropriate quantities, types of cure systems and vulcanization conditions required to carry out partial or full vulcanization of the rubber. The rubber can be vulcanized using varying amounts of curative, temperatures and time effective to obtain the optimum full crosslinking desired. Any known cure system can be used, so long as it is suitable under the vulcanization conditions for the rubber being used and is compatible with the thermoplastic polyolefin resin component of the TPV. These curatives include sulfur, sulfur donors, metal oxides, resin systems, high energy radiation and the like, both with and without accelerators and co-agents. In a further preferred alternative of the present invention crosslinking can also be effected by hydrosilylation crosslinking as disclosed in published European patent application 0776937, the disclosure of which is incorporated herein by reference.

Organic peroxides with an adequate well-known co-agent can be used as cure system except where the butyl rubber is a non-halogenated butyl rubber. The role of the co-agent in peroxide cure systems is to enhance the cure-state and inhibiting chain-fragmentation or scission effect. Specific examples of useful organic peroxides are selected from octanoyl peroxide, lauroyl peroxide, benzoyl peroxide, tert.-butyl peroctoate, p-chlorobenzoyl peroxide, 2,4-dicholorbenzoyl peroxide, cyclohexanone peroxide, tert.-butyl peroxybenzoate, methyl ethyl ketone peroxide, dicumyl peroxide, di-tert.butyl peroxide, 2,5-dimethyl-2,5-di(benzoylperoxy)hexane 2,5-dimethyl-2,5-di(tert.-butylperoxy) hexane, di-tert.-butyl diperoxiphthalate, tert.butylcumyl peroxide, diisopropylbenzene hydroperoxide, 1,3-bis(tert.-butylperoxyisopropyl)benzene tert.-butyl peroxy-pivalate, 3,5,5-trimethylhexanoyl peroxide, 1,1-bis(tert.-butyl-peroxy)-3,5,5-trimethylcyclohexane, 1,1-bis(tert.-butyl-peroxy)cyclohexane, etc.; azo compounds such as azobisisobutyronitrile, and the like.

The peroxide-based cure systems may be used with or without co-agents such as ethylene dimethacrylate, polyethylene glycol dimethacrylate, trimethylol propane trimethacrylate, divinyl benzene, diallyl itaconate, triallyl cyanurate, diallyl phthalate, allyl methacrylate, cyclohexyl methacrylate, m-phenylene bis maleimide (HVA-2), and the like.

Phenolic resin curatives are preferred for the preparation of the thermoplastic elastomer vulcanizate of the invention, and such cure systems are well known in the art and literature of vulcanization of rubbers. Their use in vulcanized compositions is more fully described in U.S. Pat. No. 4,311,628, the disclosure of which is fully incorporated herein by this reference.

A basic ingredient of such system is a phenolic curing resin made by condensation of halogen substituted phenol, $C_1$-$C_{10}$ alkyl substituted phenol or unsubstituted phenol with an aldehyde, preferably, formaldehyde, in an alkaline medium or by condensation of bifunctional phenoldialcohols. Dimethylol phenols substituted in the para-position with $C_5$-$C_{10}$ alkyl groups are preferred. Halogenated alkyl substituted phenol curing resins prepared by halogenation of alkyl substituted phenol curing resin are also especially suitable. Phenolic curative systems comprising methylol phenolic resins, halogen donor and metal compound are especially recommended, details of which are described in Giller, U.S. Pat. No. 3,287,440 and Gerstin et al, U.S. Pat. No. 3,709,840. Non-halogenated phenol curing resins are used in conjunction with halogen donors, preferably, along with a hydrogen halide scavenger. Ordinarily, halogenated, preferably brominated, phenolic resins containing about 2-10 weight percent bromine, do not require halogen donor but are used in conjunction with a hydrogen halide scavenger such as metal oxides such as iron oxide, titanium oxide, magnesium oxide, magnesium silicate, silicon dioxide and preferably zinc oxide, the presence of which promotes the crosslinking function of the phenolic resin, however, with rubbers that do not readily cure with phenolic resins, the conjoint use of a halogen donor and zinc oxide is recommended. The preparation of halogenated phenol resins and their use in a curative system with zinc oxide are described in U.S. Pat. Nos. 2,972,600 and 3,093,613, the disclosure of which along with the disclosure of the aforesaid Giller and Gerstin patents are incorporated herein by reference. Examples of suitable halogen donors are stannous chloride, ferric chloride, or halogen donating polymers such as chlorinated paraffin, chlorinated polyethylene, chlorosulfonated polyethylene, and polychlorobutadiene (neoprene rubber). The term "activator" as used herein means any material that materially increases the cross-linking efficiency of the phenolic curing resin and includes metal oxides and halogen donors either used alone or conjointly. For further details of phenolic curative systems see "Vulcanization and Vulcanizing Agents," W. Hoffman, Palmerton Publishing Company. Suitable phenolic curing resins and brominated phenolic curing resins are commercially available, for example, such resins may be purchased under the trade names SP-1045, CRJ-352, SP-1055 and SP-1056 from Schenectady Chemicals, Inc. Similar functionally equivalent phenolic curing resins may be obtained from other suppliers. As explained above, sufficient quantities of curatives are used to achieve essentially complete cure of the rubber.

For halogenated butyl rubbers, a preferred cure system is one which is based on ZnO and/or MgO. In this system, the MgO does not act as an activator but as an acid acceptor to stabilize the rubber from dehydrohalogenation.

Another preferred cure system for halogenated butyl rubbers comprises ZnO and a maleimide product. Among the maleimide product, a bismaleimide is especially superior in effectiveness and m-phenylene bismaleimide (4,4'-m-phenylene bismaleimide) (HVA-2) preferred. Other examples of the bismaleimide are 4,4'-vinylenediphenyl bismaleimide, p-phenylene bismaleimide, 4,4'-sulfonyldiphenyl bismaleimide, 2,2'-dithiodiphenyl bismaleimide, 4,4'-ethylene-bis-oxophenyl bismaleimide, 3,3'-dichloro-4,4'-biphenyl bismaleimide, o-phenylene bismaleimide, hexamethylene bismaleimide and 3,6-durine bismaleimides. Usually about 1 to about 15 weight parts, preferably from about 2 to about 10 weight parts of the curative or curative system are used per 100 weight parts of the rubber to be cured.

Conventional Additives and Fillers (iv)

Depending upon the degree to which it might be desirable to have fillers and/or additives incorporated into the elastomer phase, the fillers and/or additives may be added at the desired level of cure of the elastomer phase. As an alternative to the above process, the thermoplastic rubber (A) may be produced without fillers or additives. The fillers and/or additives may then be added in a later second compounding operation.

Generally, adding fillers and/or additives is conventional in the art of rubber compounding. Suitable additives are selected from the group consisting of pigments, antistatic agents, antioxidants, ultraviolet light stabilizers, antiblocking agents, lubricants, processing oils, waxes, coupling agents for fillers and mixtures thereof. The term "filler" as used herein refers to non-reinforcing fillers, reinforcing fillers, organic fillers and inorganic fillers. The fillers may be organic fillers and inorganic fillers (e.g., mineral fillers). Preferably, the filler is an inorganic filler. Suitable fillers include talc, silica, clays, solid flame retardants, calcium carbonate, titanium dioxide, barium sulfate, carbon black, other mineral fillers, and mixtures thereof. The carbon black can be derived from any source and be any type of carbon black such as channel blacks, furnace blacks, thermal blacks, acetylene black, lamp black and the like. Any effective amount of filler may be added. Typically, the filler may be added in an amount of up to about 60 weight percent, preferably ranging from about 2 to about 50 weight percent based on the total thermoplastic dynamically vulcanized composition (A). For specific fillers, these proportions may vary. Carbon black, for instance, is preferably added in an amount ranging from about 1 to about 40 weight percent, more preferably from 2 to 20 weight percent, based on composition (A).

It will be understood that for a particular application, the effective amount of filler or additive may well be outside of these ranges. Since the invention concentrates the filler in the thermoplastic phase where it is most needed in the case of reinforcing fillers, a reduction in the quantity of filler to be added may be expected for maintaining the same strength desired.

The suitable additives for the practice of the invention may be added in an amount ranging from about 0.05 to about 5 weight percent, preferably from about 0.05 to about 3 weight percent, based on the total composition. When the suitable additive is an ultraviolet light stabilizer, the ultraviolet light stabilizer may be present in an amount ranging from about 0.05 to about 1.0 weight percent, based on the total elastomeric composition (A).

The term "ultra-violet light stabilizer" (U.V. stabilizer, typically a particulate solid at standard temperature and pressure having a molecular weight of at least about 1,000, preferably, at least about 5,000) is used herein to denote compounds that provide stabilization or protection from the degrading effects of ultra-violet light on TPV compositions. The U.V. stabilizers do not adversely affect the TPV compositions of the present invention. It has been found that addition of U.V. stabilizers to TPV compositions can significantly decrease the crosslinking performance of curatives utilized for halobutyl elastomer materials. Such decrease does not occur to the same extent when the curative system is a maleimide curative system. Suitable U.V. stabilizers include hindered amine light stabilizers (HALS) which belong to a class of compounds referred to as "hindered amines." These hindered amines have been found to be effective in stabilizing polymers. See, for example, U.S. Pat. No. 4,064,102 the teachings of which are hereby incorporated by reference. Preferred UV stabilizers are the 2,2,4,4-tetramethylpiperidine derivatives such as N,N-bis(2,2,6,6-tetramethyl-4-piperidinyl)-1,6-hexanediamine, bis(2,2,6,6-tetra-methyl-4-piperidinyl) decane-dioate, and the reaction product of dimethyl succinate plus 4-hydroxy-2,2,6,6-tetramethyl-1-piperidine-ethanol sold by Ciba-Geigy Corporation under the trade names Chimassorb® 944LD, Tinuvin® 770, and Tinuvin® 622LD, respectively. The effective amount of U.V. stabilizer added will depend upon the particular stabilizer used and the degree of protection desired. The HALS is employed at about 0.01 to 0.5 wt % of the composition (A), preferably from about 0.02 to 0.25 wt %, and most preferably from about 0.03 to 0.15 wt %, based on composition (A).

When U.V. stabilizers are used it is preferred that the blends be dynamically vulcanized in the presence of a maleimide cure system although other cure systems discussed below are also useful. The maleimide compound preferably used in the invention is a bismaleimide compound. Among the maleimide compounds a bismaleimide compound is especially superior in effectiveness and m-phenylene bismaleimide (4,4'-m-phenylene bismaleimide) is preferred. Examples of the bismaleimide are 4,4'-vinylenediphenyl bismaleimide, p-phenylene bismaleimide, 4,4'-sulfonyldiphenyl bismaleimide, 2,2'-dithiodiphenyl bismaleimide, 4,4'-ethylene-bis-oxophenyl bismaleimide, 3,3'-dichloro-4,4'-biphenyl bismaleimide, o-phenylene bismaleimide, m-phenylene bismaleimide (HVA-2), hexamethylene bismaleimide and 3,6-purine bismaleimides.

Rubber process oils have particular ASTM designations depending on whether they fall into the class of paraffinic, naphthenic or aromatic process oils. They are derived from petroleum fractions. The type of process oil utilized will be that customarily used in conjunction with the rubber component. The ordinarily skilled rubber chemist will recognize which type of oil that should be utilized with a particular rubber. The quantity of rubber process oil utilized is based on the total rubber content, both cured and uncured, and can be defined as the ratio, by weight, of process oil to the total rubber in the TPE. This ratio may range from about above 0 to about 1.5/1, preferably about 0.2/1 to about 1.0/1; more preferably about 0.3/1 to about 0.8/1. Larger amounts of process oil can be used, the deficit being reduced physical strength of the composition. Oils other than petroleum based oils, such as oils derived from coal tar and pine tar, can also be utilized. In addition to the rubber process oils, organic esters and other synthetic plasticizers may be used.

Antioxidants can be added to the rubber composition (A). The particular antioxidant utilized will depend on the rubbers utilized as can synthetic oils such as isoparaffinic oil and more than one type may be required. Their proper selection is well within the ordinary skill of the rubber processing chemist. Antioxidants will generally fall into the class of chemical protectors or physical protectants.

Physical protectants are used where there is to be little movement in the part to be manufactured from the composition. These are generally waxy materials that impart a "bloom" to the surface of the rubber part and form a protective coating to shield the part from oxygen, ozone, etc.

The chemical protectors generally fall into three chemical groups; secondary amines, phenolics and phosphites. Typical examples of these types of anti-oxidants useful in the practice of this invention are conventional and known to the skilled person and are selected from the groups of compounds such as hindered phenols, amino phenols, hydroquinones, alkyldiamines, amine condensation products, etc. Examples for the antioxidants include phenol-based antioxidants, amine-based antioxidants, sulfur-based oxidants, and the like.

The physical antioxidants include mixed petroleum waxes and microcrystalline waxes. All or a portion of the fillers and/or additives can be added before the dynamic vulcanization step, after partial but before the dynamic vulcanization step or after the dynamic vulcanization step.

In the reinforced thermoplastic elastomer composition of this invention the thermoplastic rubber (A) may be present from about 40 wt.-% to about 95 wt.-%, preferably from about 60 wt.-% to about 85 wt.-%, most preferably from about 70 wt.-% to about 80 wt.-%, based upon the total of the thermoplastic rubber (A), the functionalized polyolefin (B), the crosslinking agent (C) and the adhesion activated reinforcing fibers (D).

Functionalized Polyolefin (B)

In accordance with the present invention the functionalized polyolefin (B) is selected from homopolymers or copolymers of $C_2$ to $C_7$ monoolefin monomers or copolymers of $C_2$ to $C_7$ monoolefinmonomers with acrylates, (meth)acrylates, such as methyl-, ethyl-, propyl-, or butyl-methacrylates or vinyl acetates. The $C_2$ to $C_7$ monoolefin monomers can be selected from ethylene, propylene, 1-butene, isobutylene, 1-pentene, 1-hexene, 1-heptene, 1-octene, 3-methyl-1-pentene, 4-methyl-1-pentene, 5-methyl-1-hexene and mixtures thereof. In a preferred embodiment of the present invention the functionalized polyolefins have grafted thereon monomers selected from unsaturated carboxylic acids containing 3 to 20 carbon atoms, unsaturated dicarboxylic acids containing 4 to 10 carbon atoms or their derivatives or their anhydrides provided that they exist, epoxy-group containing esters of unsaturated carboxylic acids containing at least 6 carbon atoms, hydroxy-group containing esters of unsaturated carboxylic acids containing at least 5 carbon atoms, oxazolines said unsaturated carboxylic acid and/or unsaturated dicarboxylic acid monomers being further functionalized with polyamines, and mixtures thereof.

Suitable functionalized polyolefins are disclosed in U.S. Pat. No. 5,609,962, the disclosure of which is fully incorporated herein by reference.

Examples of the unsaturated carboxylic acids, dicarboxylic acids that may be present in the functionalized polyolefin are those having 3 to 20 carbon atoms per molecule such as acrylic acid, methacrylic acid, maleic acid, fumaric acid and itaconic acid.

Especially preferred as grafting monomers are selected from unsaturated dicarboxylic acids having 4 to 10 carbon atoms per molecule and anhydrides thereof. These grafting monomers include, for example, maleic acid, fumaric acid, itaconic acid, citraconic acid, cyclohex-4-ene-1,2-dicarboxylic acid, bicyclo[2.2.1]hept-5-ene-2,3-dicarboxylic acid, maleic anhydride, itaconic anhydride, citraconic anhydride, allylsuccinic anhydride, 4-methylcyclohex-4-ene-1,2-dicarboxylic anhydride and bicyclo[2.2.1]hept-5-ene-2,3-dicarboxylic anhydride. In a preferred embodiment maleic acid grafted polypropylene (MA-g-PP) supplied by Uniroyal Chemical Co. under the trade designation POLYBOND® 3150 has been used.

Further grafting monomers are epoxy-group containing esters of unsaturated carboxylic acids that contain at least 6, preferably 7 carbon atoms and up to 20 carbon atoms.

Particularly preferred are glycidyl acrylate and glycidyl methacrylate. Further grafting monomers are hydroxy-group containing compounds such as hydroxy-group containing esters of unsaturated carboxylic acids containing at least 5 carbon atoms, preferably up to 6 carbon atoms and up to 12 carbon atoms such as 2-hydroxyethylmethacrylate, 2-hydroxyethylacrylate, hydroxypropylmethacrylate and hydroxypropylacrylate.

Further preferred are polyolefins which comprise amine functional groups. These are obtainable by reaction of polyolefins containing carboxylic acids, anhydrides or epoxy groups as described above with polyamines (diamines, triamines, tetramines) and derivatives thereof such as 3-amino-1-methylaminopropane, piperazine, polyoxyalkyleneamines family (Jeffamine®).

Furthermore, the polyolefins can be functionalized with an oxazoline group by using, for example, 2-(4-vinylphenyl)-4,4-dimethyl-2-oxazoline as the grafting monomer.

Various known methods can be used to graft the grafting monomer onto the basic polymer. For example, this can be achieved by heating the polymer and the grafting monomer at high temperatures of from about 150° C. to about 300° C. in the presence or absence of a solvent with or without radical initiator. Another vinyl monomer may be present during the grafting reaction. Suitable radical initiators that may be used include tert.-butyl hydroperoxide, diisopropylbenzene hydroperoxide, di-tert.-butyl peroxide, tert.butyl cumyl peroxide, acetyl peroxide, benzoyl peroxide, isobutyryl peroxide and methylethylketone peroxide.

In the functionalized polyolefin thus obtained, the amount of graft monomer, preferably the amount of the carboxylic acid or anhydride is about 0.3 to about 10 wt-0%, more preferably about 0.3 to about 5 wt.-%, and most preferably at least about 1 wt.-%, based on the weight of the functionalized polyolefin (B).

In a preferred embodiment maleated polypropylene which is supplied, e.g., by DuPont under the trade designation Fusabond® is used as the functional polyolefin (B).

In a further preferred embodiment the content of the graft monomers in the functionalized polyolefin (B) is from about 0.1 wt.-% to 10 wt.-%, preferably about 0.3 wt.-% to 5 wt.-%, most preferably about 0.5 wt.-% to 3.0 wt.-%, based on the amount of the functionalized polyolefin (B).

In the reinforced thermoplastic elastomer composition the functionalized polyolefin (B) is from about 0.3 wt.-%/0 to about 15 wt.-%, preferably from about 1 wt.-% to about 10 wt.-%, most preferably from about 3 wt.-% to about 8 wt.-%, based upon the total of the thermoplastic rubber (A), the functionalized polyolefin (B), the crosslinking agent (C) and the adhesion activated reinforcing fibers (D).

Crosslinking Agent (C)

It has surprisingly been found that the adhesion of adhesion activated fibers (D) to the thermoplastic composition (A) can significantly be improved, in particular with regard to the moisture sensitivity and bonding strength of the obtained fiber reinforced thermoplastic elastomer, if a crosslinking agent (C) is added to the composition. The crosslinking agents that are used in accordance with the present invention initiate crosslinking of the functionalized polyolefin (B) with the adhesion activation system of the reinforcing fibers (D).

Preferred crosslinking agents (C) are compounds obtainable by the reaction of melamines, urea, benzoguanamine, glycoluril or mixtures thereof with formaldehyde. Moreover, epoxy and/or isocyanate resins can be used as crosslinking agents (C) according to the present invention. In a more preferred embodiment melamine resins are used as crosslinking agents (C). Preferred melamine resins are selected from the group consisting of hexamethoxymethylmelamine resins, high solids methylated melamine resins, high solids mixed ether melamine resins and butylated melamine resins. "High solids" means that the solid content is generally above 70 to 98 wt.%, based on organic volatile measurements. Said crosslinking agents are commercially available, for instance, from SOLUTIA under the trade designation Resimene® or from CYTEC under the trade designation Cymel®. In a preferred exemplary embodiment Resimene® 745 (hexamethoxymethylmelamine) and Resimene® 3521 S are used.

In an alternative embodiment of the invention epoxy resins are used as crosslinking agents (C). Epoxy resins are prepolymers obtainable by the reaction of epichlorohydrine with a diol, triol or polyol, such as bisphenol A. The epoxy resins contain on the average two or more epoxide groups per molecule. Their reaction with a variety of curing agents leads to cross-linked or thermoset plastics with excellent strength, toughness and chemical resistance. Suitable epoxy resins are known from the prior art a commercially available. For instance, D.E.R.®, D.E.N.®, Tactix®, Quartex® supplied by Dow Chemical; Epon®, Epikote®, Eponol®, Eponex® supplied by Shell; Araldite®, Aracast® supplied by Ciba Geigy; Epi-Rz® supplied by Celanese, Epotuf® supplied by Reichold or Unox® supplied by Union Carbide, Neukadure, Biresin® and Ebalta LM® can be used.

In a further alternative embodiment isocyanate resins can be used as crosslinking agents (C). Suitable isocyanates are diisocyanates having two reactive isocyanate groups suitable to react with both the functionalized polyolefin (B) and with the adhesion activation system of the reinforcing fibers (D) in order to crosslink. Representative diisocyanates are typically selected from diisocyanates such as 1,6-hexamethylene diisocyanate, 1,8-octomethylene diisocyanate, 1,12-dodecamethylene diisocyanate, 2,2,4-trimethylhexamethylene diisocyanate and similar isocyanates, 3,3'-diisocyanatodipropyl ether, 3-isocyanatomethyl-3,5,5'-trimethylcyclohexyl isocyanate, cyclopentalene-1,3-diisocyanate, cyclohexylene-1,4-diisocyanate, methyl-2,6-diisocyanatocaprolate, bis-(2-isocyanatoethyl)fumarate, 4-methyl-1,3-diisocyanatocyclohexane, trans-vinylene diisocyanate and similar unsaturated polyisocyanates, 4,4'-methylene-bis(cyclohexylisocyanate) and related polyisocyanates, methane diisocyanates, bis-(2-isocyanatoethyl)carbonate and similar carbonate polyisocyanates, N,N'N''-tris-(6-isocyanatohexamethylene)biuret and related polyisocyanates as well as other known polyisocyanates derived from aliphatic polyamines, toluene diisocyanates, xylene diisocyanates, dianisidine diisocyanate, 4,4'-diphenylmethane diisocyanate, 1-ethoxy-2,4-diisocyanatobenzene, 1-chloro-2,4-diisocyanatobenzene, tris(4-isocyanatophenyl)methane, naphthalene diisocyanates, 4,4'-biphenyl diisocyanate, phenylene diisocyanates, 3,3'-dimethyl-4,4'-biphenyl diisocyanate, p-isocyanatobenzoyl isocyanate and tetrachloro-1,3-phenylene diisocyanate, and mixtures thereof. In a preferred embodiment of the invention isocyanates blocked by caprolactam, phenol and other blocking-agents known in the prior art are used. In a further preferred embodiment polyisocyanates based on isophorone diisocyanate and other known blocked poly-isocyanates and blends thereof are used. A caprolactam blocked isocyanate that is preferably used in conjunction with the present invention is commercially available from EMS-Chemie under the name Grilbond® IL-6.

In a preferred embodiment of the method for making the reinforced thermoplastic elastomer composition the crosslinking agent (C) is the last component added to the composition comprising the thermoplastic rubber (A), the functionalized polyolefin (B) and the adhesion activated reinforcing fibers (D), i.e., component (C) is added after thoroughly melt-blending the further components. Preferably, the crosslinking agent is added in the extrusion step, i.e., when the entire blend is at a temperature of from 150° C. to 250° C., preferably from 180° C. to 230° C.

In an alternative embodiment the crosslinking agent (C) is applied to the adhesion activated fibers (D) prior to embedding them into the thermoplastic rubber (A) and the functionalized polyolefin (B). Crosslinking proceeds at temperatures between about 150° C. and 250° C., i.e., typically under extrusion and molding conditions mentioned above.

The reinforced thermoplastic elastomer composition contains the crosslinking agent (C) in an amount from about 0.3 wt.-% to about 15 wt.-%, preferably from about 1 wt.-% to about 10 wt.-%, most preferably from about 3 wt.-% to about 7 wt.-%, based upon the total of the thermoplastic rubber (A), the functionalized polyolefin (B), crosslinking agent (C) and the adhesion activated reinforcing fibers (D).

Reinforcing Fibers (D)

The present invention is not limited to any special kind of fibers. Accordingly, any kind of organic, inorganic, synthetic or non-synthetic fibers can be used as the reinforcing fiber, for instance, fibers selected from the group consisting of polyester, polyaramid, polyethylene naphthalate (PEN), polyesterpolyarylate, polyvinylchloride, polypropylene, polyphenylenesulfide, polyetherimide, polyamide, polyimide or cellulose fibers are used. As an alternative inorganic fibers such as glass, steel, boron, carbon or wollastonite fibers, clay, talkum or fibrous hydrated magnesium silicate of the formula $Mg_4Si_6O_{15}(OH)_2.6H_2O$ can be used.

In a preferred embodiment polyaramid fibers or polyester-polyarylate fibers are used. Both kinds of fibers having high mechanical stability which facilitates the recycling of the reinforced thermoplastic elastomer compositions without decreasing their fiber-length. Suitable polyaramid fibers are commercially available from Teijin Twaron B.V. under the trade designation Twaron®, polyester-polyarylate fibers are available under the trade designation Vectran® from Celanese. According to the present invention the reinforcing fibers (D) preferably have a fiber length of about 0.3 mm to 20 mm, preferably about 1 mm to 15 mm or 6 mm, most preferably about 2 mm to 4 mm.

In a preferred embodiment the diameter of said fibers (D) ranges from about 1 to about 100 μm, preferably from about 5 to about 75 μm, most preferably from about 10 to about 30 μm.

In the preferably used reinforced thermoplastic elastomer composition the amount of adhesion activated reinforcing fibers (D) is from about 1 to about 30 wt.-%, preferably from about 5 to about 20 wt.-%, most preferably from about 8 to 16 wt.-%, based upon the total of the thermoplastic rubber (A), the functionalized polyolefin (B), the crosslinking agent (C) and the adhesion activated reinforcing fibers (D).

Typically, most of the reinforcing fibers mentioned above require a surface treatment in order to achieve good adhesion to the surrounding elastomeric matrix.

In the present invention any adhesion activating system that is suitable to react with the crosslinking agent (C) may be used.

For instance, Twaron® fibers which inter a/ia may be used in the present invention comprise a cured epoxy-containing finish as disclosed in published European patent application 0107887, the disclosure of which is fully incorporated herein by reference.

In accordance with the present invention the reinforcing fibers are adhesion activated in order to improve the adhesion between the fiber surface and the embedding thermoplastic elastomer composition matrix. Therefore, the fibers are surface treated prior to embedding them into the elastomer composition matrix. The surface treatment promotes adhesion by the formation of a thin layer of the adhesion activating agent (adhesion promoter) on the fiber surface.

In a preferred embodiment of the present invention polyester, polyesterpolyarylate- or polyaramid fibers have been treated by the method as described in U.S. Pat. No. 5,609,962 from col. 2, line 10 to col. 8 line 47, the disclosure of which is fully incorporated herein by reference.

According to that method the fibers may optionally be epoxy-activated which means that the polyester is treated with an epoxy derivative such as 1-chloro-2,3-epoxypropane (epichlorohydrine).

In a first step the fibers can be treated with a water-dispersible, blocked diisocyanate in aqueous dispersion. The blocked di-isocyanates are selected from caprolactam blocked methylene-bis-(4-phenylisocyanate) or 4,4'-methylene-bis-(phenylcarbanilate).

The treatment may be carried out by dipping the fibers into the dispersion containing the blocked diisocyanate. The dipping time commonly depends on the nature fibers and can vary from 1 second to 1 hour. After dipping the fibers are dried at a suitable temperature to effect the evaporation of water. Drying can be accomplished by exposing the fibers to a temperature of from 100° C. to 240° C. for 1 to 60 minutes, depending on the nature of the fibers.

In a second step the treated and dried fibers are then treated with a waterbased epoxy resin emulsion in an aqueous emulsion. The epoxy resins are selected from glycerol-poly-glycidylether (e.g. Glycidether 100, supplied by Raschig, Germany), epoxy resin resulting from the reaction between bisphenol A and epichlorohydrin and modified in order to make it water emulsifiable, such as Epikote® DX 258, a product of Shell Chemical or Eurepox® 756/67W supplied by Witco. As to the treatment, to the conditions of the treatment and the subsequent drying step it is referred to what has been set out above with respect to the treatment of the fibers with the dispersion of the blocked diisocyanate. Instead of dipping the fibers into the emulsions/dispersions the emulsions/dispersions can also be sprayed onto the surface of the fibers and subsequently dried.

It should be noted that the first and the second step for the treatment of the fibers can be reversed, i.e. the treatment of the fibers with the epoxy resin can be carried out prior to the treatment of the fibers with the blocked di-isocyanate. The treatment of the fibers with the blocked diisocyanate and the epoxy resin can also be carried out in one step, i.e. simultaneously. In this instance only one drying step is required.

The treatment of the fibers can also be carried out using the dispersion of the blocked di-isocyanate alone and applying it as described above. The final amount of the treatment agent (blocked di-isocyanate and epoxy-resin or blocked di-isocyanate alone) on the treated fibers is about 5 to about 500 grams per one m² of fiber surface, preferably about 20 to about 100 g/m².

The dried fibers are then further processed by bonding thereon the modified thermoplastic elastomer under the influence of heat and pressure as described herein below.

In conjunction with the present invention a caprolactame-blocked diisocyanate supplied by EMS-Chemie, Switzerland, under the trade designation Grillbond® has preferably been used.

Generally, any adhesion activation system known in the art for improving and/or imparting adhesion of filaments, such as polyester, polyaramid and polyamide fibers/filaments to rubbers when forming fiber-reinforced rubber composites can be utilized such as those disclosed in U.S. Pat. Nos. 3,956,566; 3,964,950; 3,968,304; 3,991,027; 4,009,134; 4,026,744; 4,134,869; 4,251,409 and 4,409,055, the entire disclosures of which are incorporated herein by reference.

In general the thermoplastic elastomer blend is applied to the fibers under exposure to heat and pressure, for instance by use of conventional mixing equipment such as roll mills, Banbury mixers, Brabender mixers, continuous mixers, mixing extruders, and the like.

Articles made from the cured reinforced elastomer compositions according to the present invention have good mechanical properties in combination with a high chemical, heat and pressure stability and a significantly less sensitive to humidity.

Consequently, the reinforced elastomer compositions according to the pre-sent invention can advantageously applied in processes for the manufacturing of extruded shaped articles requiring a high stability to heat and pressure and resistance to chemicals, such as in automotive applications, for instance, coolant hoses as well as tubes. Typical processes are extrusion and molding processes, such as conventional extrusion or blow molding.

Manufacturing of Shaped Articles

The reinforced elastomeric compositions according to the present invention exhibit sufficient green strength, i.e., a structural integrity necessary to minimize the shape distortion prior to solidifying of the extrudate after leaving the extrusion die orifice.

The reinforced elastomer compositions according to the present invention can be shaped by extrusion using conventional moving mandrel expanding dies. The fiber reinforced thermoplastic elastomer composition of the pre-sent invention leads to shaped articles that are less sensitive to humidity.

In order to overcome the disadvantages of sterical interaction of extruder and extrudate and the different wall thicknesses of the extrudate it has been found that an extrusion die arranged at a robotic handling unit leads to an apparatus for free-shaping of an extrudate.

The arrangement is comparable to a robotic extrusion assembly as described in U.S. Pat. No. 5,336,349 to Cornils et al., the disclosure of which is fully incorporated herein by reference.

The thermoplastic elastomer composition according to this invention is fed via an extruder 1 and a heated pressure hose 2 to a heated extrusion die 3. The extrusion die is guided by a robot 4, and the elastomer is extruded and laid by means of the extrusion die onto a preferably pre-shaped supplementary surface 5. The die is guided by an automatic handling device and the elastomer is extruded and simultaneously shaped. In a preferred embodiment the extrusion die 3 is a moving mandrel expanding die as disclosed in L. A. Goettler, A. J. Lambright, R. I. Leib and P. J. DiMauro at the meeting of the Rubber Division of the American Chemical Society on 7 to 10 October 1980 in Detroit, Mich. With this assembly acute bends are formed by offsetting the inner and outer part of the mandrel expansion extrusion die 3 and wider bends are formed by the movement of the robotic handling unit 4.

Moreover, the movement of the robotic handling unit 4 may be aligned with the off-setting of the inner die 3 in order to obtain extrudates 6 having constant wall thicknesses on the inside and on the outside of the bends.

For instance, the excessive movement of the robotic handling unit 4 would generally result in a bend that is stretched on the outside (wide radius) and compressed on the inside (narrow radius). Consequently, the wall thickness of the wall inside the bend would be thicker compared to the thinner wall outside the bend. Off-setting of the inner or outer part of the die counteracts the formation of different wall thicknesses if the annular die passage is narrow on the inside and wide on the outside of the bend.

In order to prevent the extrudate 6 from coming in contact with the extruder 1, the extrusion die 3 or the handling unit 4, the outlet orifice of the mandrel die 3 that is arranged at the handling unit 4 is oriented into a direction away from the extruder/handling unit 1/4.

In the method according to this invention common screw extruders comprising external cylinder heaters may be used, that plasticize the thermoplastic elastomeric material to the necessary processing temperature. The molten elastomer is supplied from the discharging zone of the extruder to the extrusion die via a flexible high pressure hose, also provided with a suitable heater, which hose must be capable of resisting the high pressures corresponding to the viscosity of the thermoplastic elastomer. The mandrel extrusion die is also heated by means of a suitable heater to the necessary processing temperature of the elastomer and is guided by means of a robot. Depending on the needs the pressure hose may have a length of from about 20 cm to about 6.0 m, and a diameter of from about 5 mm to 50 mm.

For further particulars about robotic extrusion reference is made to U.S. Pat. No. 5,336,349 to Cornils et al., the disclosure of which is incorporated herein by reference in its entirety.

To produce a shaped extrudate the dry blend is typically processed in a long-barrel extruder having a barrel length/diameter (L/D) ratio in the range from about 24:1 to about 60:1, fitted with a screw that provides a compression ratio greater than about 2.5:1, and a substantially constant pressure on the melt within the barrel, and preferably in the entry zone of a grooved barrel section. In one embodiment the diameter of said barrel is in the range from about 2.54 cm to about 15.24 cm. The extrudate may also be produced in a tandem or twin screw extruder.

For the extrusion process according to the present invention any extrusion die can be used. Preferred is an extrusion die that facilitates the control of the fiber orientation within the extrudate. Most preferred is a mandrel expanding extrusion die comprising an inner and an outer die that can be offset in order to shape the extrudate. The obtained parisons (extrudates) of present invention having a high melt strength based on the morphology of the thermoplastic elastomer used and also due to the presence and orientation of the short fibers which is sufficient for a parison manipulation by modern blow-molding techniques. Typical extrusion temperatures are from about 150° C. to about 250° C., preferably from about 180° C. to about 230° C.

The following examples are presented to illustrate the invention which is not intended to be considered as being limited thereto. In the examples and throughout percentages are by weight unless otherwise indicated. While in accordance with the patent statutes, the best mode and preferred embodiment have been set forth, the scope of the invention is not limited thereto, but rather by the scope of the attached claims.

EXAMPLES

Effect of Fiber Reinforcement on Burst Pressure of a Hose

The hoses have been manufactured by melt-extrusion of a composition comprising Santoprene® 121-67W175, Orevac® (carboxylated polypropylene) and the respective amounts of aramid fibers via a mandrel expanding die @ 200° C.

| Aramid fiber content [%] | 0 | 5 | 10 |
|---|---|---|---|
| Burst pressure @ 120° C. [bar] | 1.2 | 2.8 | 3.5 |

Effect of Different Shaping Methods on Fiber Reinforced Hoses

Shaping by Movement of the Robotic Handling Unit

|  | Hoop Properties | | Axial Properties | |
|---|---|---|---|---|
| Wall thickness [mm] | 2.2 | 2.6 | 2.3 | 2.5 |
| Tensile strength [MPa] | 4.5 | 4.7 | 5.1 | 5.0 |
| Elongation at break [%] | 249 | 273 | 317 | 305 |
| Modulus at 50%$_{ext.}$ [MPa] | 2.6 | 2.6 | 2.7 | 2.7 |

Note:
All measurements of the elastomeric properties have been performed according to ISO 37/1994.

Shaping by Off-setting the Die

|  | Hoop Properties | | Axial Properties | |
|---|---|---|---|---|
| Wall thickness [mm] | 2.7 | 2.1 | 2.6 | 2.3 |
| Tensile strength [MPa] | 4.3 | 4.3 | 5.0 | 5.1 |
| Elongation at break [%] | 212 | 240 | 267 | 308 |
| Modulus at 50%$_{ext.}$ | 2.5 | 2.7 | 2.8 | 2.7 |

The hoses have been manufactured by melt-extrusion of a composition comprising Santoprene® 101-64 and 5 wt.-% of aramid short fibers via a mandrel expanding die @ 200° C. The degree of cure has been determined to be above 96% as determined by the extraction method described above.

Flexible Extrusion of a TPE Hose

Materials used: Santoprene® SFR001, based on Santoprene® 101-64, maleated polypropylene and 8 wt.-% of adhesive activated polyester short fibers.

Extrusion Equipment:
Single screw extruder of 45 mm diameter and 25:1 L/D; Reis RV30 robot, mandrel expansion extrusion die with 21.2 mm outer diameter, 15.2 mm inner diameter and a 2.5:1 expansion ratio. Off-setting of the die was controlled by two DC motors.

Figure 2:
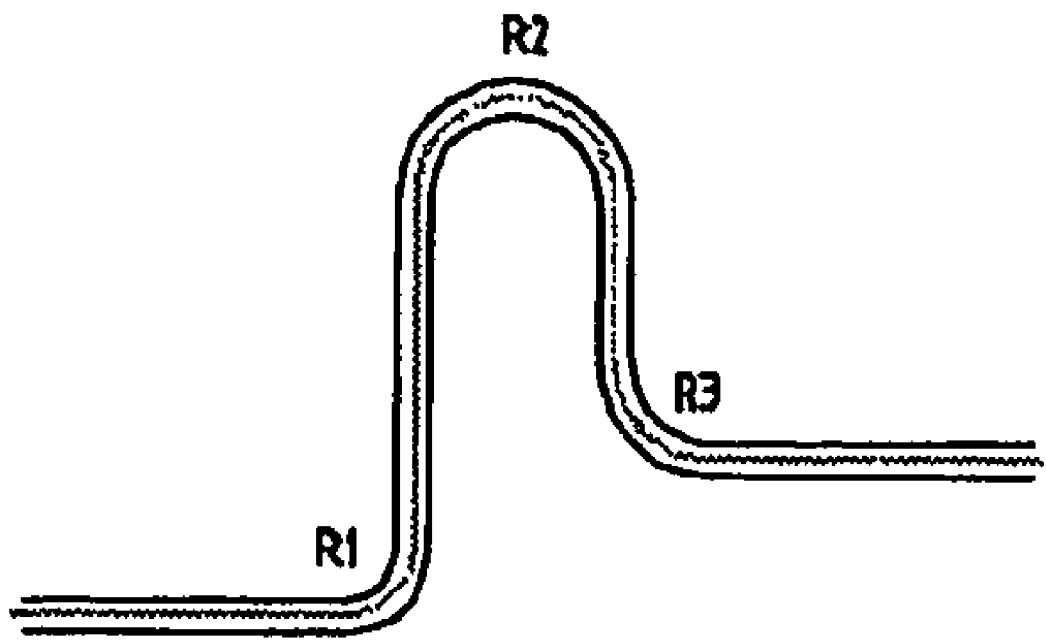
FIG. 2 represents a scheme of a hose having acute and wide bends extruded by the apparatus and method of this invention.

Test Procedure:
Extrusion of a hose with a straight end and three curves (see FIG. 2), wherein the geometry of a curve is predominantly realized by the robot movement and to a smaller extend by the off-setting of the inner die in order to compensate for any difference in wall thickness of the tube. Extrusion speed with regard to max. pressure limit: 16 mm/s @ 19.1 MPa, dosing rate of extruder: 40%.

To check the reproducibility a total of ten hoses were extruded and cut into cross sections for measuring the wall thickness. The average values are given in the Table below.

Test Results:
A reproducible extrusion of hoses could be verified. The deviation of the wall thickness in the area of the curves is acceptable as it can be derived from the list which follows.

| Curve 1 | | | Curve 2 | | | Curve 3 | | |
|---|---|---|---|---|---|---|---|---|
| inner wall [mm] | outer wall [mm] | Δ [mm] | inner wall [mm] | outer wall [mm] | Δ [mm] | inner wall [mm] | outer wall [mm] | Δ [mm] |
| 2.69 | 2.72 | 0.03 | 2.71 | 2.72 | 0.01 | 2.72 | 2.72 | 0.00 |

What is claimed is:

1. A process for fabricating a fiber-reinforced tubular extrudate having at least one or more bends, the process comprising the steps of:
   (i) extruding a fiber-reinforced thermoplastic composition to form a fiber-reinforced tubular extrudate, wherein said extruding takes place through a mandrel expansion extrusion die that includes an inner part movably positioned within an outer part and an annular die passage between the inner part and outer part, whereby the direction that the extrudate exits the die is controlled by a robotic handing unit attached to the die;
   (ii) during at least a portion of said step of extruding, positioning the inner part concentrically within said outer part to thereby produce concentricity in said annular die passage;
   (iii) during at least a portion of said step of extruding, offsetting at least one of the inner part and the outer part, relative to one another, to thereby produce eccentricity in said annular die passage and thereby produce a bend in the extrudate; and
   (iv) changing the direction that the extrudate exits the die by moving the die with the robotic handling unit in relation to the said step of offsetting to thereby produce a tubular extrudate having constant wall thickness on the inside and the outside of the bend,
   wherein the movement of the robotic handling unit is aligned with the off-setting of the die parts.

2. The process according to claim 1, wherein the fiber reinforced thermoplastic polymer is selected from the group consisting of polyvinyl chloride, polyethylene, polypropylene, polyvinyl acetate, polyester polymers, ABS copolymers, polyamides, thermoplastic elastomers, and elastomeric polymers.

3. The process according to claim 1, wherein the thermoplastic polymer is a thermoplastic elastomer.

4. The process of claim 3, wherein the thermoplastic elastomer is selected from polyurethane-polyester elastomers, segmented polyethers and polyesters, nylon block polymers and dynamically partially cured blends of polyolefin resin and mono-olefinic rubber, vulcanizable diene-containing elastomers, natural or synthetic rubbers, or mixtures thereof.

5. The process according to claim 3, wherein the thermoplastic elastomer is a fiber reinforced thermoplastic elastomer composition comprising
   (A) a thermoplastic rubber comprising
       (i) an at least partially cured rubber containing not more than 50 wt.-% of extractable rubber, where the amount of extractable rubber is determined by employing an extraction in cyclohexane for 48 hours at 23° C.; and
       (ii) a thermoplastic polyolefin homopolymer or copolymer;
   (B) a functionalized polyolefin;
   (C) a crosslinking agent selected from resins prepared by reacting melamine, urea, benzoguanamine and/or glycoluril with formaldehyde, epoxy- and isocyanate resins, and (D) reinforcing fibers adhesion activated by an epoxy-resin selected from the group of glycerol-polyglycidylether, the reaction product of bisphenol A and epichlorohydrin and/or a blocked diisocyanate.

6. The process according to claim 5, wherein the amount of thermoplastic rubber (A) is from about 40 wt.-% to about 95 wt.-%, based upon the total amount of the thermoplastic rubber (A), the functionalized polyolefin (B), crosslinking agent (C) and the adhesion activated reinforcing fibers (D).

7. The process of claim 5, wherein the amount of functionalized polyolefin (B) is from about 0.3 wt.-% to about 15 wt.-%, based upon the total amount of the thermoplastic rubber (A), the functionalized polyolefin (B), the crosslinking agent (C) and the adhesion activated reinforcing fibers (D).

8. The process of claim 5, wherein the amount of crosslinking agent (C) is from about 0.3 wt.-% to about 15 wt.-%, based upon the total of the thermoplastic rubber (A), the functionalized polyolefin (B), crosslinking agent (C) and the adhesion activated reinforcing fibers (D).

9. The process of claim 5, wherein the amount of adhesion activated reinforcing fibers (D) is from about 1 wt.-% to about 30 wt.-%, based upon the total of the thermoplastic rubber (A), the functionalized polyolefin (B), the crosslinking agent (C) and the adhesion activated reinforcing fibers (D).

10. The process of claim 5, wherein the functionalized polyolefin (B) is selected from homopolymers or copolymers of $C_2$ to $C_7$ monoolefin monomers or copolymers thereof with (meth)acrylates or vinyl acetates having grafted thereon monomers selected from
  unsaturated carboxylic acids containing 3 to 20 carbon atoms,
  unsaturated dicarboxylic acids containing 4 to 10 carbon atoms or their derivatives or their anhydrides provided that they exist,
  epoxy-group containing esters of unsaturated carboxylic acids containing at least 6 carbon atoms,
  hydroxy-group containing esters of unsaturated carboxylic acids containing at least 5 carbon atoms,
  oxazolines,
  said unsaturated carboxylic acid and/or unsaturated dicarboxylic acid monomers being further functionalized with polyamines, and mixtures thereof.

11. The process of claim 5, wherein the reinforcing fibers (D) are selected from the group consisting of polyester, polyaramid, polyester-polyarylate, polyethylene naphthalate (PEN), polyvinylchloride, polypropylene, polyphenylenesulfide, polyetherimid, polyamide, polyimide or cellulose fibers, glass, steel, boron or carbon fibers, fibers of clay, talcum, wollastonite or hydrated magnesium silicate of the formula $Mg_4Si_6O_{15}(OH)_2 6H_2O$, and blends thereof.

12. The process of claim 5, wherein the adhesion activating diisocyanate is selected from the group consisting of caprolactam-blocked methylene-bis-(4-phenylisocyanate), 4,4'-methylene-bis-(phenyl-carbanilate), and mixtures thereof.

13. The process of claim 5, wherein the melamine resin (C) is selected from the group consisting of hexamethoxymethylmelamine resins, methylated melamine resins, mixed ether melamine resins, and butylated melamine resins.

14. The process of claim 5, wherein the thermoplastic rubber (A) comprises a fully cured rubber (i) containing not more than 5 wt.-% of extractable rubber, where the amount of extractable rubber is determined by employing an extraction in cyclohexane for 48 hours at 23° C.

15. The process of claim 1, where said step of extruding is accomplished using an extruder barrel, and where the die includes an outlet orifice, and the process further comprises the step of arranging the outlet orifice in a manner that extrudate avoids contact with the extruder barrel.

16. The process of claim 1, further comprising the step of manipulating the extrudate by blow molding.

* * * * *